(12) United States Patent
Sele et al.

(10) Patent No.: US 9,080,724 B2
(45) Date of Patent: Jul. 14, 2015

(54) EXTRUDED ELEMENTS

(75) Inventors: Arne Barrett Sele, Hosle (NO); Björn Ake Klasén, Oslo (NO)

(73) Assignee: Aker Engineering & Technology AS, Fornebu (NO)

( * ) Notice: Subject to any disclaimer, the term of this patent is extended or adjusted under 35 U.S.C. 154(b) by 0 days.

(21) Appl. No.: 13/638,219

(22) PCT Filed: Mar. 31, 2011

(86) PCT No.: PCT/NO2011/000116
§ 371 (c)(1),
(2), (4) Date: Dec. 11, 2012

(87) PCT Pub. No.: WO2011/122963
PCT Pub. Date: Oct. 6, 2011

(65) Prior Publication Data
US 2013/0202846 A1     Aug. 8, 2013

(30) Foreign Application Priority Data

Mar. 31, 2010 (NO) .................................... 20100482

(51) Int. Cl.
*F17C 3/00* (2006.01)
*B32B 3/18* (2006.01)
*F17C 13/00* (2006.01)

(52) U.S. Cl.
CPC ... *F17C 3/00* (2013.01); *B32B 3/18* (2013.01); *F17C 13/004* (2013.01);
(Continued)

(58) Field of Classification Search
CPC ........... B32B 3/18; F17C 3/00; F17C 13/004; Y10T 428/24174

USPC .............. 220/651, 652, 654, 560.04, 560.05, 220/560.07, 560.08, 4.12, 4.13, 4.14, 4.16, 220/560.12; 428/78, 119, 60, 159, 188; 52/783.1, 793.1, 790.1, 793.11, 693
See application file for complete search history.

(56) References Cited

U.S. PATENT DOCUMENTS 3,941,272 A * 3/1976 McLaughlin ............ 220/560.11
4,887,862 A * 12/1989 Bassi ............................ 296/204
(Continued)

FOREIGN PATENT DOCUMENTS

DE    91 02 881 U1    4/1992
DE    43 26 074 A1    2/1995
(Continued)

OTHER PUBLICATIONS

Translation for DE 10 2007 035 772.*
(Continued)

*Primary Examiner* — Fenn Mathew
*Assistant Examiner* — Robert Stodola
(74) *Attorney, Agent, or Firm* — Locke Lord LLP

(57) ABSTRACT

An extruded beam element suitable for the construction of sandwich structures, comprises two parallel plates (2,3), each having a first part (2) and a second part (3), wherein the first parts of said plates (2) are connected by multiple webs, wherein at least two of said webs (1) are inclined with respect to the longitudinal plane (Y) perpendicular to the plates (2,3), and wherein the first parts (2) and the webs (1,5) form a relatively rigid portion of the beam element and the second parts (3) form a relatively flexible portion of the beam element, as well as sandwich panels and tanks comprising said beam elements.

20 Claims, 5 Drawing Sheets

(52) U.S. Cl.
CPC .. *F17C 2201/0157* (2013.01); *F17C 2201/052* (2013.01); *F17C 2203/03* (2013.01); *F17C 2203/0646* (2013.01); *F17C 2209/221* (2013.01); *F17C 2209/232* (2013.01); *F17C 2221/033* (2013.01); *F17C 2223/0161* (2013.01); *F17C 2223/033* (2013.01); *F17C 2260/012* (2013.01); *F17C 2270/0105* (2013.01); *F17C 2270/0123* (2013.01); *F17C 2270/0136* (2013.01); *Y10T 428/24174* (2015.01)

(56) References Cited

U.S. PATENT DOCUMENTS

| | | | | |
|---|---|---|---|---|
| 5,294,472 | A | * | 3/1994 | Arnold et al. ................. 428/120 |
| 5,972,475 | A | * | 10/1999 | Beekman ...................... 428/167 |
| 7,100,261 | B2 | * | 9/2006 | Gulati ............................ 29/463 |
| 7,178,303 | B2 | * | 2/2007 | Aota et al. ................... 52/582.1 |
| 7,596,924 | B2 | * | 10/2009 | Sakae .......................... 52/802.1 |
| 2004/0025467 | A1 | * | 2/2004 | Aota et al. ................... 52/783.1 |
| 2004/0188446 | A1 | * | 9/2004 | Gulati et al. ................. 220/651 |
| 2005/0074587 | A1 | * | 4/2005 | Snel .............................. 428/182 |
| 2007/0033899 | A1 | * | 2/2007 | Kaida et al. .................. 52/783.1 |
| 2007/0194051 | A1 | * | 8/2007 | Bakken et al. ................ 222/173 |
| 2008/0099489 | A1 | * | 5/2008 | Ramoo et al. ................ 220/565 |
| 2009/0081400 | A1 | * | 3/2009 | Wolf et al. ...................... 428/57 |

FOREIGN PATENT DOCUMENTS

| | | | |
|---|---|---|---|
| DE | 10 2007 035228 | A1 | 11/2008 |
| DE | 102007035772 | A1 * | 2/2009 |
| KR | 100850536 | B | 8/2008 |
| WO | 00/21847 | A1 | 9/1999 |
| WO | 2006/001711 | A2 | 1/2006 |
| WO | 2006 001711 | A2 | 1/2006 |
| WO | 2008/103053 | A1 | 8/2008 |

OTHER PUBLICATIONS

International Search Report mailed Jun. 6, 2011 in International Application Serial No. PCT/NO2011/000116.
Norwegian Search Report Issued in Patent Application No. 20100482 on Oct. 26, 2010, 2pp.

* cited by examiner

Figur 7

EXTRUDED ELEMENTS

FIELD OF INVENTION

The present invention relates to tanks made from aluminium extrusions, for storage and transportation of fluids such as hydrocarbons, including low temperature liquefied natural gas. More specific, the invention concerns novel extruded elements for the construction of sandwich panels for use in said tanks, as well as tanks made up of said elements. This includes tanks for ships, floating offshore structures, fixed offshore structures and tanks on land.

BACKGROUND OF THE INVENTION

WO 2006/001711 A2 describes prismatic tanks made up from a shell in the form of a sandwich structure comprising two surface-sheet layers of metal, or a material with similar properties, and a core between the surface-sheets transferring loads between the sheets, comprising of a material such as grout, or a set of ribs or webs extending between the two sheets. This disclosure represents the current technology.

This structure may provide a double, liquid tight, barrier and affords the possibility of detecting gas in between the two surface sheets as well as allowing pressure testing of the void between the sheets. This provides enhanced safety, but the major advantage of the sandwich construction is that it is structurally highly efficient.

OBJECT OF THE INVENTION

The object of the present invention is to provide novel sandwich structures having reduced weight, as well as increased fatigue resistance, compared to the prior art structures.

SUMMARY OF THE INVENTION

The present invention is further defined by the following:

One aspect of the present invention is an extruded beam element suitable for the construction of sandwich structures, wherein the transverse cross section of the beam comprises two parallel plates, each plate comprises a first part having a first end and a second part having a second end, wherein the first parts of said plates are interconnected by multiple webs, wherein at least two of said webs are inclined with respect to a longitudinal plane perpendicular to the plates, the first parts and the webs form a relatively rigid portion of the beam element and the second parts form a relatively flexible portion of the beam element.

The relative flexibility of the second parts is due to them not being interconnected by webs inclined with respect to a longitudinal plane perpendicular to the plates, more particularly, webs forming a triangular configuration together with one of the second parts. Such webs provide for a high degree of rigidity and may not be part of the flexible portion of the beam element.

One embodiment of the invention comprises an extruded beam element as described above, wherein at least two of the webs form a triangular configuration together with the first part of one of said parallel plates.

Another embodiment of the invention comprises an extruded beam element as described above, wherein at least one of the webs are parallel to a longitudinal plane perpendicular to the plates.

Yet another embodiment of the invention comprises an extruded beam element as described above wherein the first part of one of the parallel plates comprises an external rib, optionally said rib includes a flange on the free end of the rib.

A further embodiment of the invention comprises an extruded beam element as described above wherein the second part of the parallel plates have a width within the range of ½ to 1/10 of the total width of said parallel plates, preferably within the range of ⅖ to 1/7.

One embodiment of the invention comprises an extruded beam element as described above wherein a substantial section of the second part of the parallel plates have a lower thickness than the first part of the parallel plates.

One embodiment of the invention comprises an extruded beam element as described above wherein the second part of the parallel plates comprises a minor section at the second end, having a higher thickness than a major section of the second part.

Another aspect of the invention concerns a sandwich panel, wherein said panel comprises multiple extruded beam elements as described herein above.

Yet another aspect of the invention concerns a tank for storing fluid, wherein at least parts of a roof, side wall or floor of said tank comprises a sandwich structure comprising extruded beam elements as described herein above and/or a sandwich panel as described herein above.

In one embodiment of the tank described above, the tank is for storing fluid at very low temperature and comprises an internal structure formed by supporting and/or anchoring tension stays in three perpendicular directions

BRIEF DESCRIPTION OF THE DRAWINGS

Further details of the invention are described below with reference to the exemplifying embodiments shown schematically in the appended drawings, wherein.

DETAILED DESCRIPTION OF THE DRAWINGS

Figure 1:
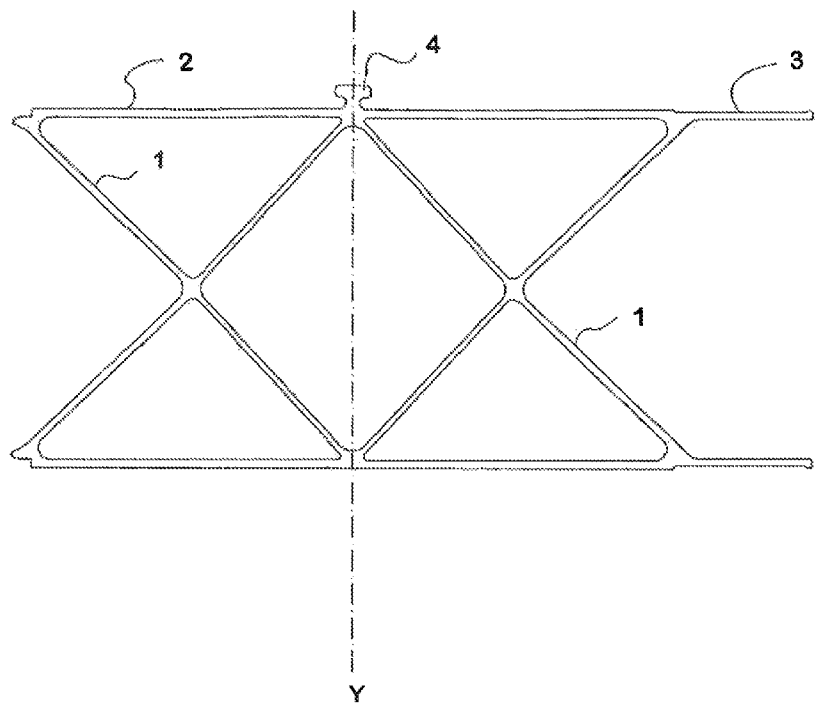
FIG. 1 shows a cross section of an extruded beam element with a triangulated portion and a portion with plate connections. Such beam extrusions make up the panels.

FIG. 1 shows a cross section of the extruded beam element, which make up the panels from which the tank shell is assembled. The central cross section is made up from webs 1 and plate sections 2 in a triangular pattern. On one side, or both sides of the extrusion cantilevering plate extensions 3 are provided. These cantilevering plate connections, which become propped when elements are joined by welding, provide a flexible connection between the individual beam elements making up the panels which constitute the shell.

In principle such sandwich extrusions are from a structural point of view most efficiently made up of a large number of cells. Contrary to this, production is most cost effective with a smaller number of cells. The cantilevering plate extensions should be between ½ of the width of the extrusion and 1/10 to provide the desired flexibility. This makes it desirable that the size of the cells in the extrusion is of a similar size to the length of the cantilevering portion.

A rib 4 forming part of the extrusion may be used to make an efficient connection to brackets and tension beams restraining load induced by hydrostatic or pneumatic pressure. This rib may include a small flange to guide automatic welding equipment.

The cantilevering plate extensions 3 have a lower thickness then the section at which the weld is made. Welds in some aluminium alloys have lower strength then the parent material. If such welds experience loads at which they yield, only the width of the weld will experience elongation. As a consequence the weld will reach rupture with very little deformation. For this reason a section 17 of the base metal adjacent to the weld is made sufficiently thin that yielding will initiate in the base metal before the weld ruptures. This ensures that the structure performs in a ductile way.

Figure 4:
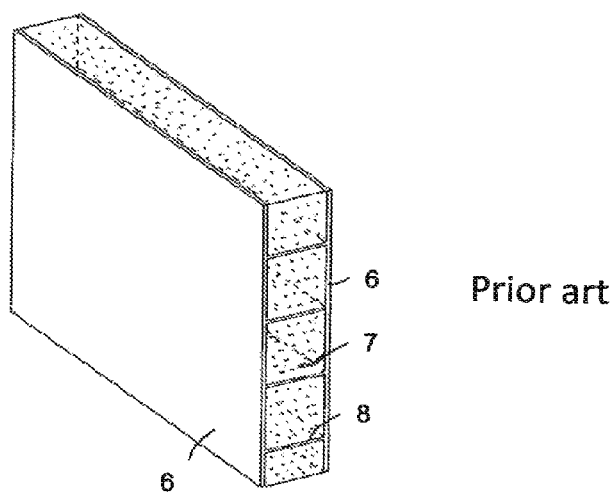
FIGS. 4 to 6 show different cross sections of different embodiments of an external shell with a uniform sandwich construction according to previously known technology.
Figure 5:
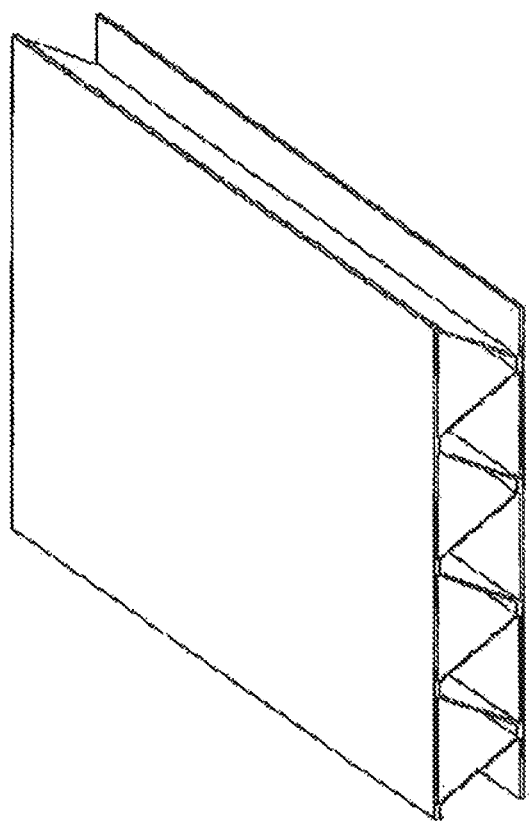
Figure 6:
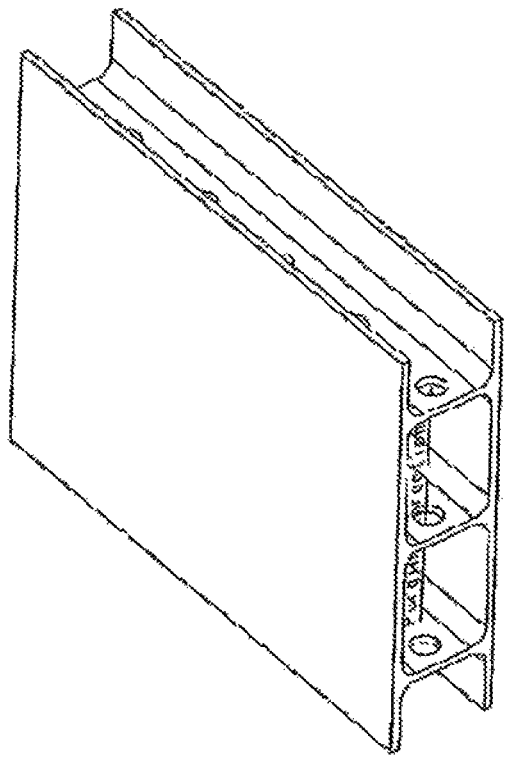

The short flexural plate connections between the extruded beam elements radically reduce stress due to restraints between beam elements as stress will only be due to plate bending which are orders of magnitude lower then that due to beam bending. Such restraints occur adjacent to parallel walls and other structure causing the beams to deform in a way that is not supported by the beams bending about the principal axis perpendicular to the web. The stress induced by such restraint does not effectively contribute to supporting the imposed load. The current technology as illustrated in FIGS. 4, 5, and 6 mobilises far greater transverse bending resistance causing greater restraint due to mobilising beam action. As illustrated in FIGS. 5 and 6 said prior art panels do not have the flexible section present in the current invention. The lack of flexibility is due to either or both the uniform distribution of the ribs/webs connecting the two sheets and the greatly increased thickness of the flange, depending on which prior art technology that is considered.

The effect of using the novel extruded elements according to the present invention is a considerable reduction of the weight of the aluminium shell. In addition, the greater flexibility also reduces fatigue.

The panels that make up the shell are constructed by joining multiple extruded elements.

Thus, the object of the present invention is obtained by constructing sandwich structures using novel extruded elements with a rigid section made up of triangulated elements and intermediate highly flexible plate elements.

The rigid sections provide more effective bending load capacity for the sandwich beams as the stress in the flanges become principally due to beam bending and the stress due to plate bending is radically reduced by the reduced distance between the multiple webs provided.

Figure 2:
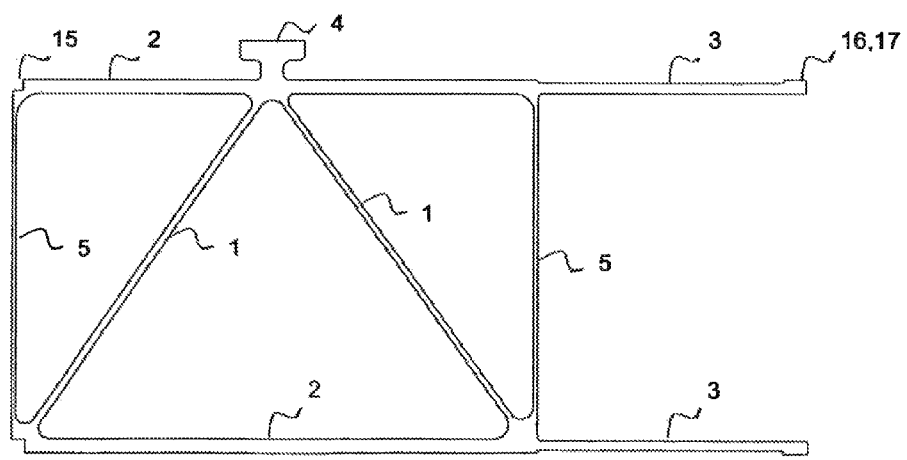
FIG. 2 shows an alternative extruded cross section.

FIG. 2 shows a cross section of an alternative extruded beam element with a configuration designed according to the same principles as the one shown in FIG. 1. In addition to being connected by the inclined plates 1, the plates 2 are also connected by the parallel plates 5, which are perpendicular to said plates 2.

Figure 3:
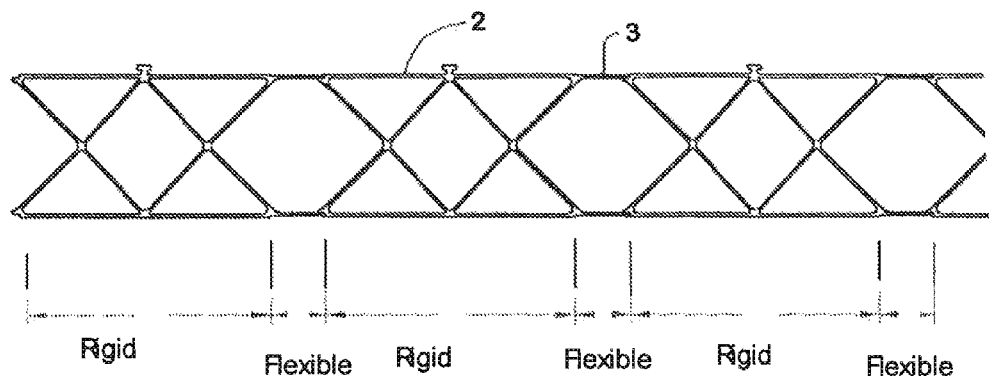
FIG. 3 shows a sandwich panel made by welding a plurality of extrusions together.

FIG. 3 shows a cross section where a plurality of extrusions have been welded together to form a panel. The drawing shows how a very rigid section is created by locking it together in triangular shapes. Each extrusion is connected to the next only by plates, which provides a very flexible connection.

FIG. 4 shows an embodiment with the outer plates 6 of the shell where a core material 7, or ribs or webs 8 may alternatively be provided or both.

FIG. 5 shows an embodiment where a continuous pattern of triangular plates provide the sandwich structure.

FIG. 6 shows an embodiment where the plates are supported by ribs or webs.

FIGS. 4, 5 and 6, show embodiments of previously established technology.

Figure 7:
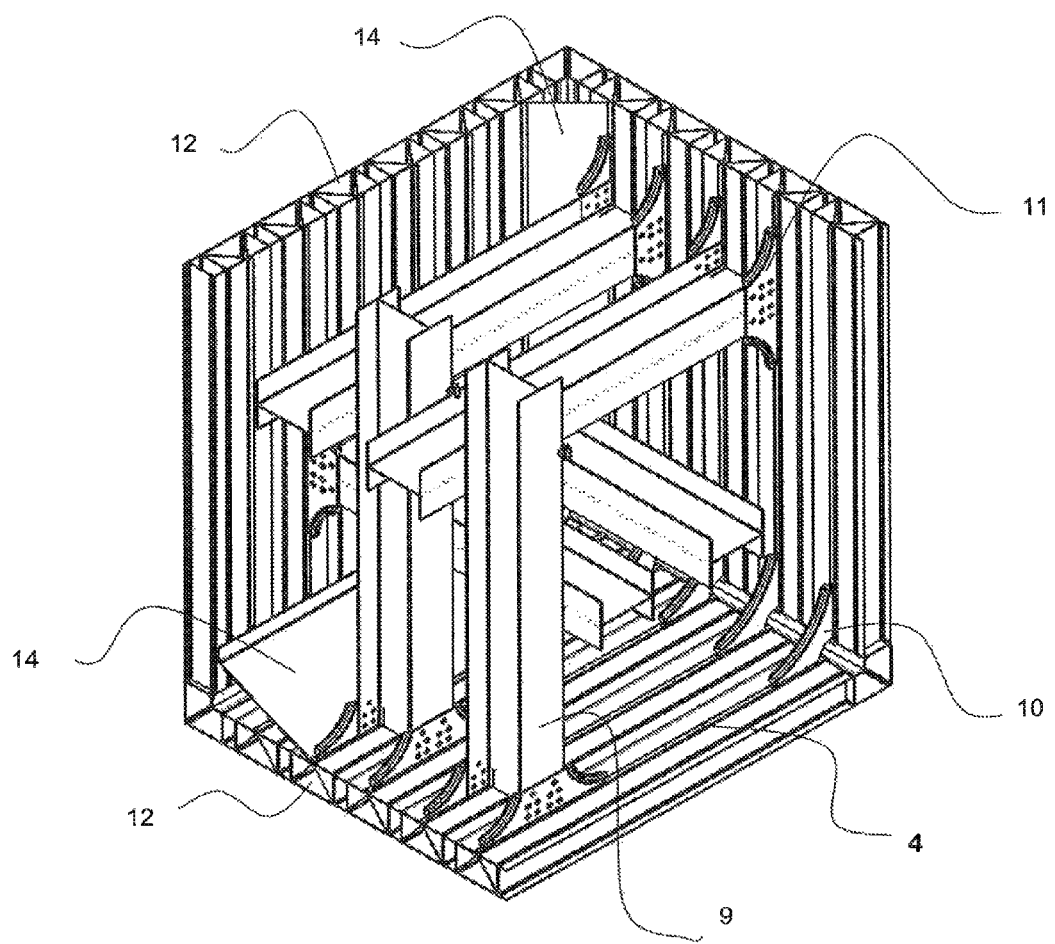
FIG. 7 shows an isometric drawing of a section of a tank made up from sandwich panels according to the present invention.

FIG. 7 shows part of the tank where the shell 12 consists of the extrusions shown in FIG. 1 made into panels as shown in FIG. 3. The panels connect into brackets 11 connected to the rib 4 in the panel extrusion. Other forged corner brackets 10 connect panels with ribs 4 meeting at the corner. The brackets 11 also connect into tension beams 9 which restrain the hydrostatic and pneumatic internal pressure. In corners that are parallel to ribs 4 plates 14 reinforce the corners.

Figure 8:
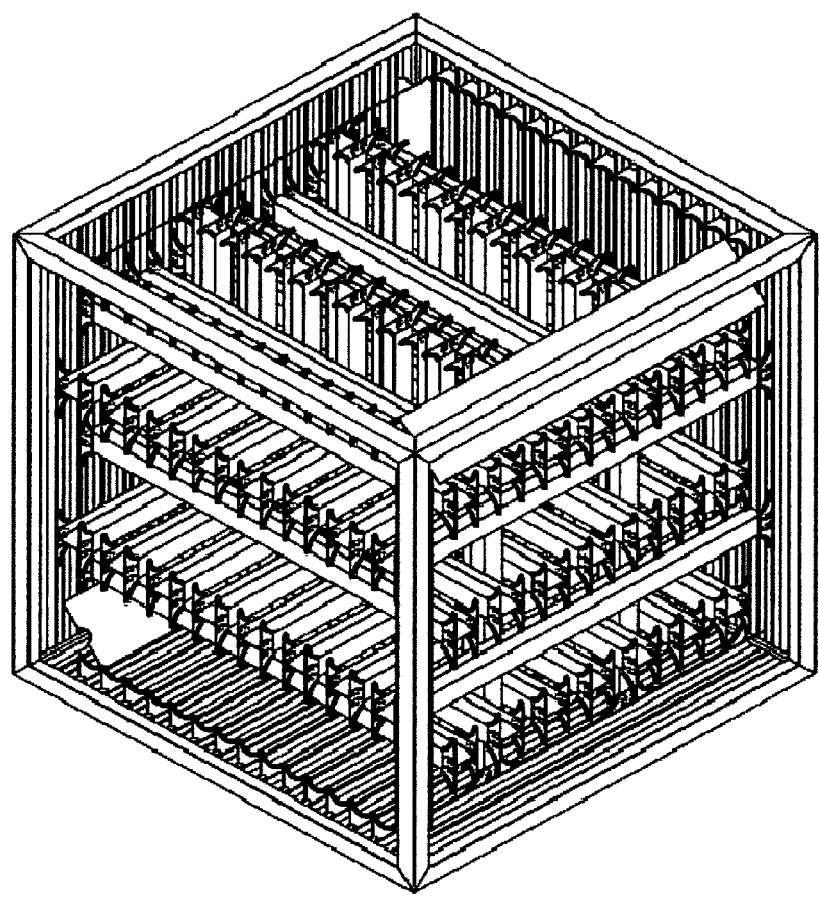
FIG. 8 is a view similar to FIG. 7 and shows the internal structure of the tank.

FIG. 8 shows the internal structure of the tank.

The invention claimed is:

1. An extruded beam element suitable for the construction of sandwich structures, comprising two parallel plates each of which comprises a first part connected to a cantilevering part lying in the same plane as the first part, the first parts of said plates being interconnected by multiple webs whose junctures with the first part conclude at about the connection between the cantilevering part and the first part on each of said parallel plates, wherein a minor section of the cantilevering part has a higher thickness than a major section of said cantilevering part and the major section of the cantilevering part has a lower thickness than the first part.

2. The extruded beam element according to claim 1, wherein at least one of the webs is parallel to a longitudinal plane that is perpendicular to the plates.

3. The extruded beam element according to claim 1, wherein the first part of the parallel plates comprises an external rib on its free end.

4. The extruded beam element according to claim 1, wherein the cantilevering part of the parallel plates has a width within the range of ½ to ⅒ of the total width of the parallel plates.

5. The extruded beam element according to claim 1, wherein the minor section at an end of the cantilevering part has a higher thickness than the major section of said cantilevering part.

6. The extruded beam element according to claim 1, wherein each of said first part comprises a receptacle for a longitudinal edge of the cantilevering part of an identical extruded beam element.

7. A sandwich panel, wherein said panel consists essentially of multiple extruded beam elements according to claim 1.

8. A tank for storing fluid, wherein at least parts of a roof, side wall or floor of said tank comprises a sandwich structure comprising extruded beam elements according to claim 7.

9. The tank according to claim 8, wherein the tank is for storing fluid at very low temperature and comprises an internal structure formed by supporting and anchoring tension stays in three perpendicular directions.

10. A sandwich panel, which comprises multiple identical extruded beam elements, wherein each element comprises two parallel plates, wherein each plate comprises a first part and a cantilevering part extending from the first part and lying in the same plane, the first parts of said plates being interconnected by multiple webs, wherein at least two of said webs are inclined with respect to a longitudinal plane that is perpendicular to the plates, wherein at least two of the webs form a triangular configuration together with the first part of one of said parallel plates, whereby the cantilevering parts are connected to a web or webs only at the transition between the first and the cantilevering parts, wherein the first part of the parallel plates is configured to receive an end of the cantilevering part of an identical extruded beam element, wherein a major section of the cantilevering part has a lower thickness than the first part.

11. A sandwich panel according to claim 10, wherein at least one of the webs is parallel to a longitudinal plane that is perpendicular to the plates.

12. The sandwich panel according to claim 10, wherein the first part of one of the parallel plates comprises an external rib.

13. The sandwich panel according to claim 10, wherein the cantilevering part of the parallel plates has a width within the range of ½ to 1/10 of the total width of the parallel plates.

14. The sandwich panel according to claim 10, wherein a minor section at an end of the cantilevering part has a higher thickness than the major section of said cantilevering part.

15. A fluid storage tank, wherein at least parts of a roof, side wall or floor of said tank comprise a sandwich structure comprising multiple identical extruded beam elements, wherein each extruded beam element comprises two parallel plates of equal width, wherein each plate comprises a first part and a cantilevering part integral with the first part, the two parts lying in the same plane, the first parts of said plates being interconnected by multiple webs, wherein at least two of said webs are inclined with respect to a longitudinal plane that is perpendicular to the plates, and wherein at least two of the webs form a triangular configuration together with the first part of one of said parallel plates whereby the cantilevering parts are connected to a web or webs only at the transition between the first and cantilevering parts, wherein the cantilevering parts of the parallel plates are configured to engage first parts of a second, identical sandwich structure, wherein a major section of the cantilevering parts of the parallel plates has a lower thickness than the first part of the parallel plates.

16. The tank according to claim 15, wherein at least one of the webs is parallel to a longitudinal plane that is perpendicular to the plates.

17. The tank according to claim 15, wherein the first part of one of the parallel plates comprises an external rib which includes a flange on the free end of the rib.

18. The tank according to claim 15, wherein the cantilevering part of the parallel plates has a width within the range of ½ to 1/10 of the total width of the parallel plates.

19. The tank according to claim 15, wherein a minor section at an end of the cantilevering part has a higher thickness than the major section of said cantilevering part.

20. The tank according to claim 15, wherein the tank is for storing fluid at very low temperature and comprises an internal structure formed by supporting and anchoring tension stays in three perpendicular directions.

* * * * *